June 19, 1934.   E. S. PURINGTON   1,963,246
IMPEDANCE CONTROL SYNCHRONIZATION
Filed Feb. 11, 1930
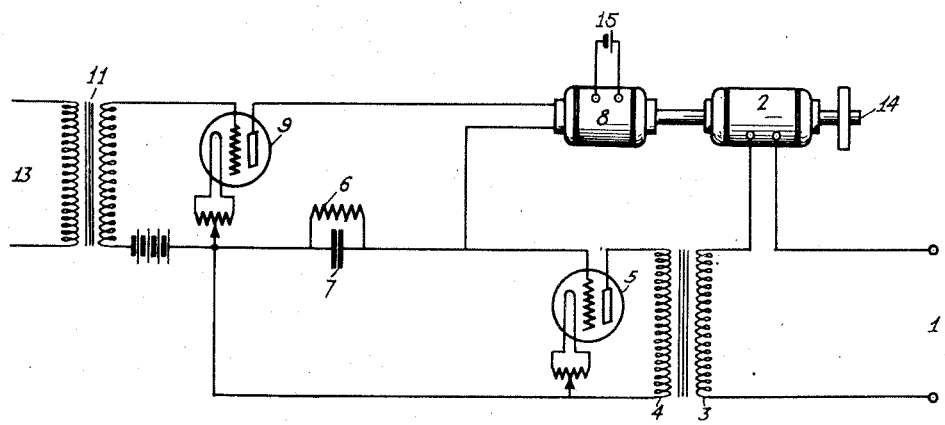
INVENTOR
ELLISON S. PURINGTON
BY
ATTORNEY Patented June 19, 1934

1,963,246

UNITED STATES PATENT OFFICE 1,963,246

IMPEDANCE CONTROL SYNCHRONIZATION

Ellison S. Purington, Gloucester, Mass., assignor to John Hays Hammond, Jr.

Application February 11, 1930, Serial No. 427,476

7 Claims. (Cl. 172—293)

One of the objects of this invention is to provide a method of controlling a rotating shaft in accordance with periodic changes in an electric current.

Another object of this invention is to produce a mechanical rotation corresponding to an alternating electrical current.

A further object of this invention is to provide an apparatus for controlling the rotation of a shaft in accordance with the pulsations of an alternating current.

A further object is to control the output of an alternating current generator so as to be in electrical synchronism with controlling electrical oscillations.

A still further object of this invention is to provide a smooth and steady motion for driving the moving parts of mechanical and electrical devices.

A yet further object of this invention is to provide a system for accomplishing the above objects in which the controlling generator may be of very small power.

Another object of this invention is to provide a system which is quiet in operation, due to the low current existing in the controlling circuits.

A still further object of this invention is to provide a system for controlling the rotation of a mechanical device in which no high power direct current is required.

These and further objects of this invention will become apparent from the following specification taken in connection with the accompanying drawing.

In the prticular application shown in this specification, the controlling current may be obtained from any source, such as an oscillator or from the transmitting station with which it is desired to synchronize the action of a receiving system. It may be desired that the rotation of the shaft be extremely constant in order to provide the driving energy for reception of facsimile or television, or for similar uses. In the event that the controlling pulses are transmitted from the transmitting station, the present invention will, upon a small change in the speed of the transmitter, cause a corresponding slight variation in the speed of the receiver, maintaining at all times complete synchronism. This may be of extreme importance with respect to facsimile, in which it might be noted for instance, that the receiver was giving incorrect printing results due to improper speed. In this case, the transmitter would be requested to alter the speed, and the receiver would correspondingly alter its speed to obtain the correct speed.

In accomplishing the objects of my invention, I use a small rotating type generator of the same frequency rating as the normal frequency of the control current, and I cause the joint operation of these two frequencies to hold the motor in step with the electrical controlling current by forcing it to produce a current of the same frequency as the controlling current. More particularly, I accomplish this by controlling the value of an impedance in the input of the motor. The impedance is regulated in value in accordance with the phase relationship of the generator and the controlling frequency.

Having thus briefly described my invention, attention is invited to the accompanying drawing in which the figure represents a schematic wiring diagram for the apparatus composing the elements of my invention.

Referring now more particularly to the figure, the alternating current input 1 is fed to the driving motor 2 which may be of the universal type. Included in the input line, is the primary 3 of the transformer 3—4. The secondary of the transformer 3—4 is included in the plate circuit of the impedance tube 5. For impressing upon the grid of the impedance device 5, a varying potential, there is included in its grid circuit a resistor 6 and condenser 7 arranged in parallel as shown. Adapted to be rotated by the motor 2 is an A. C. generator 8, the output of which is adapted to supply the plate voltage for the bias rectifier 9. Included in the plate circuit of said rectifier 9 are the aforementioned resistance 6 and condenser 7 which are, as before mentioned, included in the grid circuit of the impedance device 5. The input of the bias rectifier 9 is through the transformer 11 from a source of controlling current proceeding through the lines 13. The input of said bias rectifier includes a biasing potential as shown. The alternating current generator is appropriately supplied with a field current by a source, which is, in this instance, shown as the battery 15. The shaft of the motor 2 is adapted to drive a load, the speed of driving which it is desired to control. In this instance, a scanning disc 14 is shown as mounted upon the motor shaft.

Having thus described the circuit constituting my invention, I will now describe its operation.

The equivalent primary impedance of the transformer 3—4 is dependent upon the impedance external to the secondary which consists of the plate filament circuit of the impedance tube 5. Thus when tube 5 presents a high impedance, a small reaction of the secondary on the primary exists, and the equivalent primary impedance is high, and low voltage is delivered to the motor. On the other hand with the tube 5 presenting a low impedance, the reaction of the secondary upon the primary circuit is great, and its impedance is low with a high voltage delivered to the motor 2. The impedance of tube 5 is in turn controlled by the joint action of the control frequency coming through lines 13 and the generator frequency in the following manner. The tube 9 is a phase controlled rectifier with operation similar to that disclosed in my co-pending application, Serial No. 313,713 filed October 20, 1928. Generator 8, which is driven by the shaft of the motor by direct or geared connection, produces an A. C. current which normally matches the control frequency current and actuates the plate circuit of the tube 9. The incoming or controlling current is impressed upon the grid of the rectifier 9, proper precaution being taken to prevent a reaction through the tube 9 upon the controlling source. The direct current rectified in the output of the rectifier 9 and flowing through the resistor 6 will depend upon the relative phases of the incoming and locally generated current. The bias on the impedance tube 5 is thus determined by the rectified output of the tube 9.

In operation, suppose that the circuits are originally synchronized, and suppose that the mechanical load of the motor 2 changes so as to slow down the motor. Then the phase of the current produced by the generator 8 decreases with respect to that of the incoming current resulting in a reduction in the rectified output of the rectifier 9. This will reduce the D. C. voltage across the resistor 6, and therefore, decreases the bias on the tube 5. This causes the impedance of tube 5 to be lower permitting more current to flow in the secondary winding 4. This will cause a greater reaction upon the primary with more primary current flowing at a lowered primary voltage. As a result, a greater voltage and current is impressed upon the motor 2 which causes the speed to increase.

Therefore, in practice, increasing the mechanical load of a motor in any manner will cause an increase in the voltage applied to the motor and the speed will be maintained as desired.

Similarly, a change in the frequency of the control source introduced through lines 13, results in a change of power to the motor which causes it to change speed so that the current produced by the generator 8 will have a frequency corresponding to the control current frequency.

A peculiar advantage of this system is that the generator 8 may be of very small power, say of less than one watt for controlling a 100 watt motor. The synchronizing power is derived from the power mains without converting it to a high frequency, as is required in many other systems. This makes for a system which is quiet in operation, whereas the systems involving high powered audio frequency generators have a high frequency hum. Also this system is readily adapted to all A. C. operation direct from the power lines, since no high power D. C. is required except that which may be readily obtained from lower power rectifier equipment.

It is obvious that when desired amplifiers may be inserted before the impedance device 5, and that a plurality of impedance devices may be arranged to operate in push-pull to obtain almost any desired ratio between the power of the controlling generator and the driving motor.

It is also obvious that various other changes may be made in the specific embodiment shown and described for the purpose of illustration, but that I am not to be limited by this specific embodiment, but by the scope of my invention as pointed out in the following claims.

I claim:

1. A source of alternating current energy having a frequency determined by the speed of rotation of a rotating member, means for synchronizing a second rotating member with said first rotating member comprising, means for driving the member to be synchronized, a transformer having a primary and a secondary winding, means for connecting said driving means to a source of electrical energy in series with the primary of the transformer, a variable power absorption circuit connected to the secondary of the transformer, a phase controlled rectifier device having an input and an output circuit, means for impressing said alternating current energy upon one of said last two named circuits, an alternating current generator connected to said driving means for generating alternating current of a frequency determined by the speed of rotation of said driving means, means for impressing said last named alternating current energy upon the other of said two rectifier circuits and means in said output circuit connected to said variable power absorption circuit for controlling the amount of energy absorbed thereby in accordance with the variations in phase between the two impressed alternating current energies for varying the speed of the driving means in accordance therewith.

2. A source of alternating current energy having a frequency determined by the speed of rotation of a rotating member, means for synchronizing a second rotating member with said first rotating member comprising, an electric motor for driving the member to be synchronized, a transformer having a primary and a secondary winding, means for connecting said driving motor to a source of electrical energy in series with the primary of the transformer, a variable power absorption circuit connected to the secondary of the transformer, a phase controlled rectifier device having an input and an output circuit, means for impressing said alternating current energy upon the input circuit of said rectifier, an alternating current generator connected to said driving means for generating alternating current of a frequency determined by the speed of rotation of said driving means, means for impressing said last named alternating current energy upon the output circuit of said rectifier and means in said output circuit connected to said variable power absorption circuit for controlling the amount of energy absorbed thereby in accordance with the variations in phase between the two impressed alternating current energies for varying the speed of the driving means in accordance therewith.

3. A source of alternating current energy having a frequency determined by the speed of rotation of a rotating member, means for synchronizing a second rotating member with said first rotating member comprising, means for driving the member to be synchronized, means including an energy transfer device for connecting said driving means to a source of electrical energy, a variable power absorption circuit connected to said energy transfer device, a phase controlled rectifier device having an input and an output circuit, means for impressing said alternating current energy upon one of said last two named circuits, an alternating current generator connected to said driving means for generating alternating current of a frequency determined by the speed of rotation of said driving means, means for impressing said last named alternating current energy upon the other of said two rectifier circuits and means in said output circuit connected to said variable power absorption circuit for controlling the amount of energy absorbed thereby in accordance with the variations in phase between the two impressed alternating current energies for varying the speed of the driving means in accordance therewith.

4. A source of alternating current energy having a frequency determined by the speed of rotation of a rotating member, means for synchronizing a second rotating member with said first rotating member comprising, means for driving the member to be synchronized, means including an energy transfer device for connecting said driving means to a source of electrical energy, a variable power absorption circuit connected to said energy transfer device, a phase controlled rectifier device having an input and an output circuit, means for impressing said alternating current energy upon the input circuit of said rectifier, an alternating current generator connected to said driving means for generating alternating current of a frequency determined by the speed of rotation of said driving means, means for impressing said last named alternating current energy upon the output circuit of said rectifier and means in said output circuit connected to said variable power absorption circuit for controlling the amount of energy absorbed thereby in accordance with the variations in phase between the two impressed alternating current energies for varying the speed of the driving means in accordance therewith.

5. A source of alternating current energy having a frequency determined by the speed of rotation of the rotating member, means for synchronizing a second rotating member with said first rotating member comprising, means for driving the member to be synchronized, means including an energy transfer device for connecting said driving means to a source of electrical energy, a variable power absorption circuit connected to said energy transfer device, a phase controlled rectifier comprising a space discharge device having an input circuit and an output circuit, said input circuit including a source of biasing potential, means for impressing said alternating current energy upon the input circuit of said space discharge device, an alternating current generator connected to the driving means for generating alternating current of a frequency determined by the speed of rotation of said driving means, means for impressing said last named alternating current energy upon the output circuit of said space discharge device and means in said output circuit comprising a resistance element shunted by a capacity and connected to said variable power absorption circuit for controlling the amount of energy absorbed by said absorption circuit in accordance with the variations in phase between the two impressed alternating current energies for varying the speed of the driving means in accordance therewith.

6. A source of alternating current energy having a frequency determined by the speed of rotation of the rotating member, means for synchronizing a second rotating member with said first rotating member comprising, means for driving the member to be synchronized, a transformer having a primary and a secondary winding, means for connecting said driving means to a source of electrical energy in series with the primary of the transformer, a variable power absorption circuit connected to the secondary of the transformer, a phase controlled rectifier comprising a space discharge device having an input circuit and and output circuit, said input circuit including a source of biasing potential, means for impressing said alternating current energy upon the input circuit of said space discharge device, an alternating current generator connected to the driving means for generating alternating current of a frequency determined by the speed of rotation of said driving means, means for impressing said last named alternating current energy upon the output circuit of said space discharge device and means in said output circuit comprising a resistance element shunted by a capacity and connected to said variable power absorption circuit for controlling the amount of energy absorbed by the absorption circuit in accordance with the variations in phase between the two impressed alternating current energies for varying the speed of the driving means in accordance therewith.

7. A source of alternating current energy having a frequency determined by the speed of rotation of the rotating member, means for synchronizing a second rotating member with said first rotating member comprising, means for driving the member to be synchronized, means including an energy transfer device for connecting said driving means to a source of electrical energy, a variable power absorption circuit comprising a space discharge device having an input circuit and an output circuit, said output circuit including said energy transfer device, a phase controlled rectifier device comprising an electronic device having an input circuit and an output circuit, said last named input circuit including a source of biasing potential, means for impressing said alternating current energy upon the input circuit of said electronic device, an alternating current generator connected to the driving means for generating alternating current of a frequency determined by the speed of rotation of said driving means, means for impressing said last named alternating current energy upon the output circuit of said electronic device and means in said output circuit comprising a resistance element shunted by a capacity and forming part of the input circuit of the space discharge device of the absorption circuit for controlling the amount of energy absorbed thereby in accordance with the variations in phase between the two impressed alternating current energies for varying the speed of the driving means in accordance therewith.

ELLISON S. PURINGTON.